Figure 1:
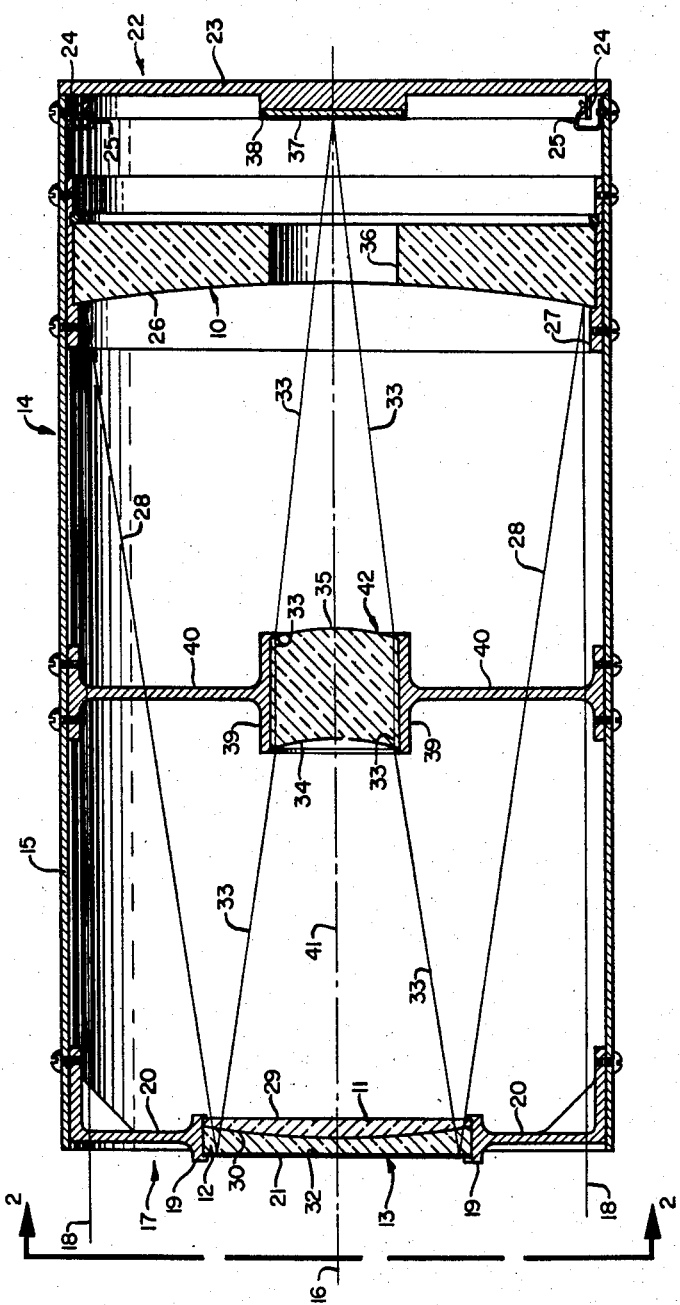

April 27, 1965     S. C. ARGYLE ETAL     3,180,217
CASSEGRAINIAN TYPE TELESCOPE OPTICAL SYSTEM
UTILIZING A COMA CORRECTING MENISCUS
Filed Jan. 22, 1960     2 Sheets-Sheet 1

INVENTOR.
SIDNEY C. ARGYLE
JAMES M. PARKER
BY
ATTORNEY

United States Patent Office 3,180,217
Patented Apr. 27, 1965

3,180,217
CASSEGRAINIAN TYPE TELESCOPE OPTICAL SYSTEM UTILIZING A COMA CORRECTING MENISCUS
Sidney C. Argyle, Glendora, and James M. Parker, Livermore, Calif., assignors to Aerojet-General Corporation, Azusa, Calif., a corporation of Ohio
Filed Jan. 22, 1960, Ser. No. 4,154
3 Claims. (Cl. 88—57)

This invention relates to image forming optical systems.

An object of this invention is to provide such a compact optical system highly corrected for spherical abberation, chromatic aberration, coma and having a substantially flat field with a minimum of astigmatism. Such a system is especially useful as a telephoto lens.

A further object of this invention is to provide such an optical system in which lower cost and more easily manufactured spherical reflecting and refracting surfaces are utilized.

In long range lens systems such as for an astronomical telescope, or the like, it is usual to use a large primary mirror to converge sufficient light rays for forming a suitable image. The imaging of far distant objects (which must be considered for purposes of design as practically at infinity) is most suitably accomplished by use of a paraboloidal convergent reflecting mirror which brings an image of an object positioned at infinity to a sharp focus. However, since plane and spherical surfaces are the only ones which can be produced at sufficiently low cost for most practical purposes, it is desirable to provide an optical system having optical components utilizing either spherical surfaces only or both such types of surfaces. Furthermore, even for non-astronomical optical lens systems it is desirable to provide for such an optical system for use in imaging far distant objects, one application being for telephoto lenses. Telephoto lenses, because they are generally operated from confined areas by one person, should be as compact in size and as light in weight as they may conveniently be made.

This invention is carried out by providing a compact Cassegrainian type telescope optical system utilizing optical components with only spherical and flat surfaces. A thick secondary mirror is chosen with such properties as to obtain achromatism and yet avoid severe residual aberrations, while a correcting lens is provided in the light path between the secondary mirror and the focus to minimize coma, the combination of all lenses and mirrors being so chosen as to produce an image essentially free of spherical aberration, chromatic aberration and coma. In its broadest aspect, the invention comprises the combination of a concave primary mirror, a "thick" achromatic secondary mirror, and a thick low power meniscus arranged intermediate the secondary mirror and the system focal plane. It is to be understood that the term "thick" as used herein with regard to the achromatic secondary mirror shall mean a lens system composed of two or more lenses, one of which has a reflective back surface, which in this instance, is the surface which is furtherest from the primary mirror.

Figure 2:
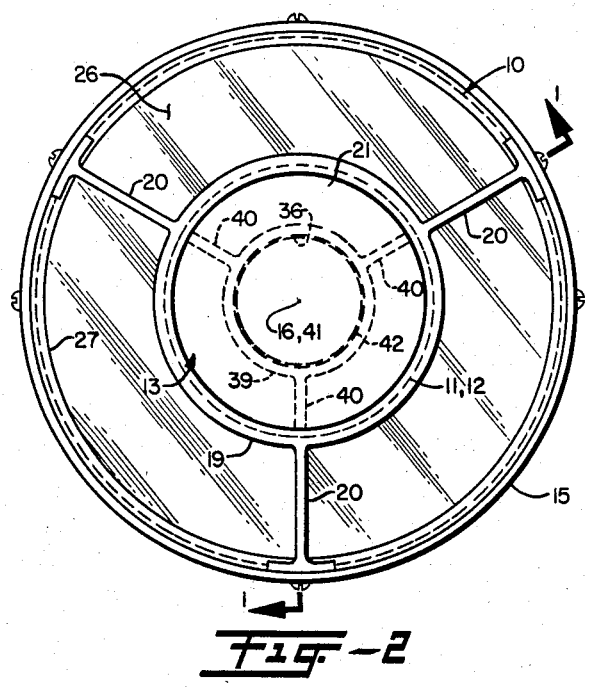

These and other features will be fully understood from the following detailed description and drawing of which:

FIG. 1 is a longitudinal sectional view of an optical system according to the invention; and
FIG. 2 is an end view taken at line 2—2 in FIG. 1.

In its preferred embodiment the invention comprises a primary mirror 10, a thick secondary mirror 13 which includes a correcting cemented doublet 11, 12 and a matched reflective coating 32 deposited on the far side of the doublet as seen by the primary mirror, and finally a thick correcting meniscus lens 42 of low power, shown here as being but not limited to a position approximately midway between the primary and secondary mirrors.

A barrel 15 having a central axis represented by the dotted line 16 is provided as an enclosure for the optical system 14. The optical axis of each of the respective components of the optical system 14 is disposed in such a manner as to be coincident with the axis 16 of the barrel 15. The barrel 15 has an end 17 which is open so that light rays, two of which are represented by the ray lines 18, may enter the barrel.

A mounting 19 is provided to surround the periphery of the matched doublet 11, 12 and reflective coating 32 comprising the secondary mirror 13. A support spider 20 is attached to the interior of the barrel and to the mounting 19, so as to hold the doublet 11, 12 and the reflective coating 32 with their optical axes on the axis 16 of the barrel. An opaque back 21 on the reflective coating 32 faces the same direction as the open end 17 of the barrel.

The light rays 18 which enter the barrel pass inside and through the barrel's length and are reflected by the primary mirror 10 which is located within the barrel near a closed end 22 which is opposite the open end 17. The closed end 22 is provided with a cover 23 having prongs 24 which extend into the barrel and are there held by spring clamps 25 provided on the interior of the barrel.

For purposes of clarity and brevity, all refracting surfaces whose centers of curvature lie to the right of the surface will hereafter be designated as convex surfaces; those whose centers of curvature lie to the left of the surface will be called concave surfaces and flat surfaces will be called plane. Mirrors, however, will be called collecting or dispersing according as they cause light from a distant object to converge or diverge respectively. Surface 26 of the primary mirror is a collector. Its optical axis is coincident with a portion of the barrel's axis 16 and its position is maintained by a suitable peripheral mounting 27 which is attached to the interior of the barrel.

The reflected light rays, two of which are represented by the ray lines 28, from the spherical reflecting surface 26 are directed toward the open end 17 of the barrel and inward toward the barrel's axis 16. This reflected disposition of the light rays permits the light rays 28 to be intercepted by a concave spherical surface 29 of the doublet 11, 12. The light rays traverse the cemented doublet, passing through the convex intersurface 30 of the doublet to the secondary diverging reflective coating 32 deposited on the opposite face. The reflected light rays from the surface 32 are represented by the lines 33 which extend back toward the closed end 22 of the barrel and inward toward the barrel's axis 16.

The light rays 33 are reflected back through the doublet 11, 12 toward the concave surface 34 of the low power correcting lens 42. After passing through the corrector and the opening 36 through the primary mirror 10, the rays arrive at a focal plane beheind the primary mirror 10.

The low power correcting lens is held in a position such that its optical axis is coincident with a portion of the barrel's axis 16 by a mounting 39 and a support spider 40 which extends from the mounting to the interior of the barrel where it is attached in any suitable manner. A photographic plate 37, or the like, may be attached by plate holders 38 to the cover 23 for the purpose of recording an image which is formed by the optical system 14. The plate 37 is positioned in the focal plane where the light from the correcting lens 42 comes to a focus on the plate 37.

The optical components 10, 11, 12 and 32 of the optical system 14 may conveniently be circular and placed concentric about the system's optical axis 41, which also is the barrel's axis 16, the concentricity being best shown in FIG. 2. A convenient set of design data for an optical system like that shown in this disclosure, and which has a focal length of 48 inches and with a speed of $f/4$, is presented in the following table:

| | | | |
|---|---|---|---|
| $R_{26}=-45.404$ | $t_{26-29}=13.145$ | | |
| $R_{29}=-271.643$ | $t_{29-30}=0.776$ | $N_{29-30}=1.54140$ | $V_{29-30}=47.5$ |
| $R_{30}=16.979$ | $t_{30-32}=0.193$ | $N_{30-32}=1.54110$ | $V_{30-32}=59.9$ |
| $R_{32}=-48.507$ | $t_{29-34}=4.364$ | | |
| $R_{34}=-8.490$ | $t_{34-35}=3.296$ | $N_{34-35}=1.52300$ | $V_{34-35}=58.6$ |
| $R_{35}=-8.342$ | | | |

The symbol R refers to the radius of curvature in inches of the surface identified by the subscript and the mathematical sign is in accordance with optical convention. The "$t$" in the table above is to be understood as distance in inches along the optical axis 41. The numeral subscripts in the table indicate that which the various data apply to by corresponding with numerals found in FIG. 1. For example, $R_{26}$ refers to the radius of curvature of surface 26. $t_{26-29}$ refers to distance from surface 26 to surface 29. $N_{29-30}$ refers to the index of refraction of the glass between surfaces 29 and 30. $V_{29-30}$ refers to the dispersion value of the glass between surfaces 29 and 30.

The mountings and supports for the various optical components as well as the photographic recording means are shown here for purposes of illustration. It will be understood that other types may be used instead. For example, the rigidly constructed mountings shown might be replaced by mountings which are adjustable or removable for greater convenience; and the plate photographic recording means shown might be replaced by more convenient photographic film which is supplied from a roll. For greater convenience, a shutter might also be provided between the primary mirror and the film plate 37. Suitable baffles to eliminate stray light may also be provided.

FIG. 1 shows the Cassegrainian type telescope utilizing the thick secondary mirror. The doublet 11, 12 on which the reflective coating 32 is deposited to form the secondary mirror 13 is of substantial thickness for rigidity and to accommodate the curvature used.

In FIG. 1, light rays represented by the lines 18 are incident to the primary mirror 10 on its surface 26 and are reflected as rays 28 so as to be incident on the refracting surface 29. The rays are then successively refracted at surfaces 29 and 30, reflected at surface 32 and once more refracted at 30 and 29 in that order, and so become incident upon surface 34. The reflected rays 33 are refracted by the surfaces 34 and 35 so as to form a focus at the photographic plate 37 located at the system's focal plane. In the preferred embodiment the components of the correcting doublet 11, 12 are constructed of materials of approximately the same refractice indices but of varying dispersions. The two surfaces were cemented to form a single interface and also it was convenient to provide the reflective portion of the secondary mirror 13 as the reflective surface 32. In other embodiments the doublet components 11, 12 could be separated by a small air space, or alternately the reflective portion of the secondary mirror 13 could be separated from the surface 32 by a small air space. If desired, a triplet could replace the doublet 11, 12 and such a substitution will reduce residual aberrations. Although shown here to be located at the rear of the primary mirror, the focal plane may be arranged within the interior of the telescope, in some applications.

A Cassegrainian type telescope, such as the one in this disclosure, provides a compact image forming optical system very highly corrected, partly by correcting lens 42, for spherical aberrations, chromatic aberration, and coma, and partly by the matched optical components 11, 12, and 32 chosen to match in the manner previously stated so that this choice of matching obtains achromatism and yet avoids severe residual aberrations. Utilization of this same combination provides the desirable high degree of correction for spherical aberration, chromatic aberration and coma. Furthermore, only relatively inexpensive and easily manufactured spherical reflecting and refracting surfaces are used in the invention to accomplish this result. In addition, a flat wide angle field with little astigmatism is accomplished. The longer focal lengths are especially suitable as telephoto lenses for photographic purposes.

Although one embodiment of our invention has been described and shown with some degree of detail, it is our desire not to limit the invention to the particular embodiment shown, but to limit it only in accordance with the scope of the appended claims since persons skilled in the art may devise other embodiments which are still within the limitations of said claims.

We claim:

1. A Cassegrainian type telescope optical system comprising a primary mirror having a reflecting surface and also having a centrally disposed hole therethrough, said primary mirror being so disposed and arranged that its reflecting surface faces an object field which may be imaged by said optical system, a secondary mirror formed from an achromatic doublet comprising a first lens and a second lens, said second lens made reflective on the surface farthest apart from said primary mirror, said first lens and said second lens being matched in such a manner as to have substantially equal mean refractive indices and substantially unequal dispersion for correction of chromatic aberration, a third lens disposed intermediate the positions of said primary mirror and said secondary mirror to substantially eliminate coma and provide a highly corrected wide field of view, and said primary and secondary mirrors and said third lens of the optical system being disposed in fixed relationship relative to one another on a common optical axis, whereby light rays of the object field which are incident upon said primary mirror are reflected by said primary mirror, then refracted, reflected, and refracted by said secondary mirror, then refracted by said third lens, and then passed through said hole provided through said primary mirror on the opposite side of which the light rays incident to the optical system are brought to a focus.

2. A Cassegrainian type telescope optical system according to claim 1 in which said primary and secondary mirrors and said third lens are provided with only spherical reflecting and refracting surfaces.

3. An optical system comprising the combination of a convergent primary mirror, a thick secondary mirror, and a low-powered correcting lens interposed between the primary and secondary mirrors; the primary mirror, the secondary mirror, and the low-powered correcting lens being in axial alignment and being arranged whereby light incident on the primary mirror from an object is reflected to the thick secondary mirror which refracts, reflects, and refracts the light to the low-powered correcting lens which in turn refracts the light to a focus in the proximity of the primary mirror, wherein the design parameters of said convergent primary mirror, said thick secondary mirror, and said low-powered correcting lens are substantially as follows:

| | | | |
|---|---|---|---|
| $R_{26} = -45.404$ | $t_{26-29} = 13.145$ | | |
| $R_{29} = -271.643$ | $t_{29-30} = 0.776$ | $N_{29-30} = 1.54140$ | $V_{29-30} = 47.5$ |
| $R_{30} = 16.979$ | $t_{30-32} = 0.193$ | $N_{30-32} = 1.54110$ | $V_{30-32} = 59.9$ |
| $R_{32} = -48.507$ | $t_{29-34} = 4.364$ | | |
| $R_{34} = -8.490$ | $t_{34-35} = 3.296$ | $N_{34-35} = 1.52300$ | $V_{34-35} = 58.6$ |
| $R_{35} = -8.342$ | | | | where R is the radius of curvature of a lens surface in inches and the subscript identifies the particular surface in the optical system;

$t$ represents distance along the optical axis in inches and the subscripts identify the surfaces between which the distance is measured;

N represents the index of refraction of the material between the lens surfaces identified by the subscripts;

V represents the dispersing value of the material between the lens surfaces identified by the subscripts; and the focal length of the optical system is 48 inches.

References Cited by the Examiner
UNITED STATES PATENTS

| | | | |
|---|---|---|---|
| 2,448,699 | 9/48 | Bouwers | 88—57 |
| 2,730,926 | 1/56 | Back et al. | 88—57 |
| 2,761,354 | 9/56 | Steglick | 88—57 |
| 2,968,220 | 1/61 | Steglick | 88—57 |
| 2,970,220 | 1/61 | Bouwers | 88—57 |
| 3,001,446 | 9/61 | Bowers et al. | 88—57 |

FOREIGN PATENTS 936,424  12/55  Germany.

JEWELL H. PEDERSEN, *Primary Examiner.*

SAMUEL FEINBERG, BENJAMIN A. BORCHELT, SAMUEL BOYD, *Examiners.*